Figure 1:
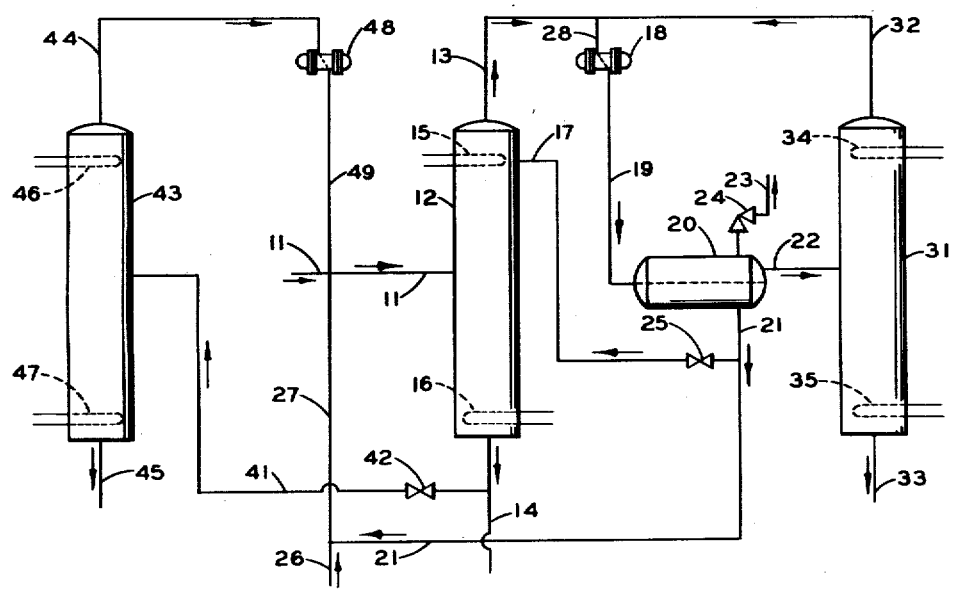

June 4, 1957 M. R. CINES ET AL 2,794,773
SEPARATION OF HYDROCARBON TYPES BY AZEOTROPIC DISTILLATION
Filed Dec. 20, 1950

INVENTORS
M. R. CINES
F. N. RUEHLEN
BY
ATTORNEYS

United States Patent Office 2,794,773
Patented June 4, 1957

2,794,773
SEPARATION OF HYDROCARBON TYPES BY AZEOTROPIC DISTILLATION

Martin R. Cines and Forrest N. Ruehlen, Bartlesville, Okla., assignors to Phillips Petroleum Company, a corporation of Delaware Application December 20, 1950, Serial No. 201,841

14 Claims. (Cl. 202—42)

This invention relates to the separation of types of hydrocarbons by means of distillation. In one aspect, it relates to a process for the separation of narrow boiling range fractions of hydrocarbons containing two or more types of hydrocarbons. In another aspect, it relates to a process for the separation of such hydrocarbons by distillation with completely fluorinated monocarboxylic saturated aliphatic acids as entrainers.

The separation of volatile compounds by azeotropic distillation is well known and is practiced to effect separations which are difficult or even impossible by ordinary distillation methods. The mixtures of volatile compounds in many instances have such volatility characteristics that ordinary distillation yields only one component of acceptable purity, and in some instances substantially no separation at all is effected. This difficulty in effecting separation by fractional distillation may be due to the formation of constant boiling mixtures or azeotropes, or it may be that the boiling points of the components are so close together that columns of a practical number of plates are ineffective. In order to separate such mixtures, solvent extraction or azeotropic distillation processes may be used. In the process of azeotropic distillation, an additional volatile component is added which so alters the volatilities of the original constituents that satisfactory separation in a fractionating column of practical number of plates becomes possible. In order for azeotropic distillation to be useful, separation and recovery of the entrainer from the products must be possible. Most azeotropes, as is well known, are of the low boiling or minimum boiling point type, although some high boiling or maximum boiling point ones are known. In this type of distillation, the entrainer is added to the system and it preferentially azeotropes with one or more of the components, during the distillation. The azeotrope of the entrainer with one or more components of the mixture which are desired to be separated has a greater volatility than the remaining component or components and/or azeotropes thereof. Upon separation of the entrainer from the azeotropic mixture by any of various known means, the separation of the original mixture has been effected. In case any entrainer remains in solution in the still bottoms, it may be separated therefrom to complete the separation and recovery process. Normally, however, the amount of entrainer employed is adjusted so that substantially all is taken overhead and the kettle product is substantially entrainer-free.

One object of our invention is to provide a process for the separation of a narrow boiling range fraction of hydrocarbons containing two or more types of hydrocarbons.

Another object of our invention is to provide a process for separating a narrow boiling range fraction of hydrocarbons containing two or more types of hydrocarbons by distillation methods.

Still another object of our invention is to provide a process for separating a narrow boiling range fraction of such hydrocarbons by application of the principles of azeotropic distillation.

Still other objects and advantages of our process will be realized upon reading the following disclosure which taken with the attached drawing forms a part of this specification.

To accomplish the foregoing and related objects, we have found that narrow boiling range mixtures of certain types of hydrocarbons may be separated into their component hydrocarbons or types of hydrocarbons by azeotropic distillation in the presence of a monocarboxylic saturated aliphatic acid in which the alkyl group is completely fluorinated. As illustrative of the types of hydrocarbons which may be separated by our process are such hydrocarbon types as paraffins, cycloparaffins and aromatics. In our process of azeotropic distillation, the presence of this completely fluorinated acidic entrainer so alters the volatility of the hydrocarbons that a mixture of the entrainer and hydrocarbons of two or more of these types is recovered from the overhead product and hydrocarbons of one or more of these types are recovered from the kettle product.

We have discovered in the refining of hydrocarbons the improvement comprising subjecting a mixture of close boiling hydrocarbons to distillation conditions in the presence of a completely fluorinated organic acid boiling within 80° F. of the hydrocarbon taken overhead, recovering a hydrocarbon from the overhead distillate and recovering another hydrocarbon from the distillation bottoms, the completely fluorinated organic acid being a monocarboxylic saturated aliphatic acid in which the alkyl group is completely fluorinated.

The term "perfluoro" is intended to be synonymous with the term "completely fluorinated" as used throughout this specification and claims. For example, the term "perfluoroacetic acid" is intended to be synonymous with the term "completely fluorinated acetic acid." In the fluorination of such carboxylic acids it is, of course, intended that only the alkyl group is completely fluorinated. In other words, all hydrogen atoms bonded directly to carbon atoms are replaced by fluorine atoms. Our invention is intended to include such monocarboxylic saturated aliphatic acids as trifluoroacetic acid, heptafluorobutyric acid and other acids of this series in which, of course, all of the hydrogens of the alkyl groups are replaced by fluorine atoms.

A perfluoro acid entrainer of our invention should have a normal boiling point within 80° F. of the material to be taken overhead and will vary according to the boiling range of the mixture of hydrocarbons to be separated. The term "boiling within 80° F. of the material to be taken overhead" is intended to include temperatures above as well as below the boiling point or range of material to be taken overhead.

Distillations, according to our process, are usually carried out at pressures of about atmospheric or slightly above atmospheric as, for example, about 50 pounds per square inch gage. Higher pressures may be used if such be desirable from the standpoint of facilitating processing.

Conventional azeotropic distillation columns may be used, for example, packed columns, bubble cap columns, or perforated plate columns. As in other distillations, highly efficient columns will effect better separations than columns having a smaller number of theoretical plates. In some instances, satisfactory operations by our process can be effected with a column having as few as five theoretical plates; while for other separations, columns having a greater number of theoretical plates are required. The number of theoretical plates will depend, of course, upon such conditions as the hydrocarbons concerned and the degree of separation desired, as well as the particular entrainer used and the relative volatilities of the hydrocarbons in the presence of the entrainer.

In our process, separation of the azeotrope and its components, hydrocarbon and entrainer, is readily effected. Upon condensation of the azeotrope vapor and cooling, ordinarily two liquid phases are formed. The lighter phase is predominantly a hydrocarbon phase but may contain some perfluoro compound in solution. The heavier phase is largely perfluoro acid containing some hydrocarbon in solution. This heavier phase may ordinarily be directly recycled to the azeotropic distillation column as entrainer with the feed stock. The hydrocarbon phase having some entrainer in solution, upon distillation, is freed from entrainer and hydrocarbon is removed from the kettle section of the column as one of the separated products of the process.

In certain cases, upon condensation of azeotrope vapor and cooling, only one liquid phase is formed. This liquid phase will contain the distilled hydrocarbon and entrainer in the same ratio as these materials were distilled from the azeotrope column. In this particular case, one mode of separating the components involves liquid-liquid extraction with water in which the entrainer is soluble and the hydrocarbon is insoluble. The hydrocarbon is separated as raffinate while the extract phase consists of the entrainer dissolved in water. This extract phase is subsequently treated by distillation; and, in those cases of an aqueous azeotrope, the azeotrope or even the water-perfluoro acid extract phase may be extracted with a secondary solvent such as the hydrocarbon feed stock to the process for the recovery of the entrainer.

Figure 2:
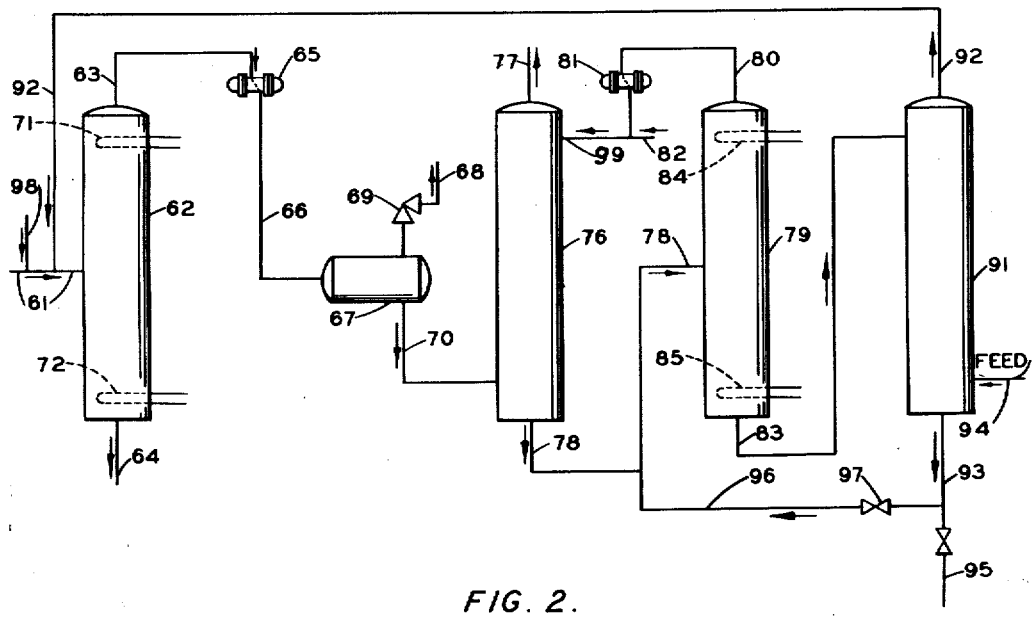

In the drawing, Figure 1 is a diagrammatic representation of one form of apparatus in which to carry out the process of our invention. Figure 2 is another embodiment of apparatus in which to practice the process of our invention.

We will illustrate the operation of the process of our invention for separating a cycloparaffin hydrocarbon from an aromatic hydrocarbon utilizing the apparatus of Figure 1. The particular hydrocarbon mixture separated according to this illustration is a mixture of equal volumes of cyclohexane and benzene. Cyclohexane has a normal boiling point of 177.3° F. and benzene boils at 176.2° F. From the nearness of these boiling points to one another it is obvious to those skilled in the distillation art that the separation of two such hydrocarbons is a difficult problem. Such a separation is still more difficult, or substantially impossible, by fractional distillation in case the two hydrocarbons form an azeotrope. Whether or not such a pair of hydrocarbons forms an azeotrope is immaterial to the process of our invention since an extraneous azeotrope former is added to alter the relative volatilities of the component hydrocarbons in such a manner that one can be made to distill overhead substantially to the exclusion of the other. A mixture composed of equal volumes of cyclohexane, benzene, and trifluoroacetic acid, from a source not shown, is passed through line 11 into about the center of a fractional distillation column 12. Sufficient reboiling heat is added from coil 16 to effect distillation of this three-component mixture. The overhead vapors from this column are removed through line 13 and flow through line 28 into a condenser 18 in which condensation is intended to be complete. The condensate flows on through line 19 into an accumulator tank 20. The bottoms accumulating in the still 12 is withdrawn through line 14 and when sufficiently free from extraneous material may be withdrawn from the system through line 14 to subsequent storage or such use as desired. If this bottoms material contains, for example, a recoverable proportion of entrainer, the bottoms are then passed through line 41 containing valve 42 for subsequent treatment in still 43.

It is intended that substantially the required amount of entrainer will be charged into still 12 so that none will be included in the bottoms product flowing through line 14. In ordinary operation, to make certain that little or no entrainer is included in the bottoms product, it is advisable to add to column 12 a slight deficiency of entrainer for removing overhead the hydrocarbon forming the lowest boiling azeotrope. When adding slightly less entrainer than the amount equivalent to the hydrocarbon to be taken overhead, some of this hydrocarbon will remain in the kettle product. For many purposes the presence of a small amount of the hydrocarbon desired to be distilled overhead remaining in the still bottoms will be immaterial.

The condensate accumulating in the vessel 20 will separate into two liquid phases. The upper phase is a hydrocarbon phase and contains cyclohexane with some trifluoroacetic acid in solution. The heavy and lower phase is trifluoroacetic acid with some cyclohexane in solution. This lower phase is withdrawn from vessel 20 through line 21. In case it is desired to use reflux in column 12, a portion of this heavy phase from line 21 may be by-passed therefrom through line 17 containing valve 25 and introduced into the top of this column. If it is desired to use closed coil refluxing, either supplementary to the reflux from line 17 or in place of this latter refluxing, a cooling medium may be circulated through the closed reflux coil 15.

The trifluoroacetic acid containing some cyclohexane not used for refluxing purposes is passed on through lines 21, 27 and 11 and introduced therefrom as a portion of the charge stock into the main azeo column 12. When the operation of such an apparatus has become equalized, all of the trifluoroacetic acid required in column 12 will be furnished from the separator tank 20 through lines 21, 27 and 11. Any additional entrainer required for makeup purposes may be introduced into the system through line 26.

The hydrocarbon phase consisting mainly of cyclohexane with some trifluoroacetic acid is removed from settler 20 through line 22 and introduced into a distillation column 31. In case pressure relief is required for accumulator tank 20, we have provided a line 23 containing a pressure relief valve 24. The distillation column 31 is an azeotrope column more or less similar to column 12. In column 31 the charge stock will be cyclohexane containing a small amount of dissolved trifluoroacetic acid. Heat for distillation purposes is furnished by a reboiler coil 35, and an azeotrope mixture of cyclohexane and trifluoroacetic acid is removed as vapor through line 32. The amount of this azeotrope removed overhead will ordinarily be relatively small and will depend upon the solubility of the trifluoroacetic acid in the cyclohexane at the temperature maintained in the accumulator vessel 20. Coil 34 is provided in the top of column 31 for refluxing purposes. Since the composition of the azeotrope passing through line 32 from the top of column 31 is the same as that of the azeotrope passing through line 13 from column 12, these two vapor streams are combined in line 28 to be condensed in condenser 18. This mixed condensate then flows through line 19 into accumulator tank 20 as previously described. The azeotrope vapors from column 31 and from column 12 will have the same composition providing these two distillation columns are operated at the same pressure. If the pressure of column 31 changes the composition of the overhead vapor will change accordingly, but such a change in composition will make little difference as the quantity of this stream is small relative to the stream from line 13. These streams will be combined regardless of their specific concentration of components since the components are the same.

The excess of cyclohexane over that removed as azeotrope with the trifluoroacetic in column 31 is removed from this column through the bottoms drawoff line 33 for passage to storage or subsequent use as desired.

In case the main azeo column 12 is operated in such a manner that an appreciable quantity of entrainer is contained in the bottoms, this entrainer may be recovered in the auxiliary azeo still 43. This bottoms product is, under this condition, withdrawn from still 12 through line 14 and passed through line 41 containing valve 42 into about the mid-portion of the column 43. Reboiling heat is furnished through coil 47 and cooling for reflux purposes is furnished through coil 46 as required. An azeotrope consisting of trifluoroacetic acid and benzene is removed overhead through line 44. This vapor is condensed in condenser 48 and the condensate flows through line 49 and is added to the charge stock in line 11. The liquid accumulating in the bottom of the auxiliary column 43 consists of benzene free from entrainer and this material is withdrawn from the process through line 45 as product.

When cyclohexane and benzene and trifluoro acetic acid are charged into column 12 in equal volumes and the column operated at atmospheric pressure, the azeotrope vapors are removed from this column at a temperature of about 238° F.

This embodiment of apparatus, Figure 1, may be used for carrying out a separation between a paraffin hydrocarbon and a cycloparaffin hydrocarbon, for example, 2,4-dimethylpentane and cyclohexane. In this particular system, the two hydrocarbons and the trifluoroacetic acid entrainer are charged to column 12 in about equal volumes. Under a column pressure of 15 pounds per square inch, the overhead vapors consist of an azeotropic mixture of cyclohexane and trifluoroacetic acid and are removed from the column at a temperature of about 137° F. Upon condensation of this azeotrope two liquid phases separate. The hydrocarbon phase containing some entrainer is treated in still 31 for the recovery of entrainer and for the production of cyclohexane.

The bottoms accumulating in the primary column 12 consists of 2,4-dimethylpentane with or without some entrainer, depending upon whether or not an excess of entrainer is used with respect to the cyclohexane content of the charge stock. If the proper amount of entrainer if used, the bottoms accumulating in column 12 will be 2,4-dimethylpentane free from cyclohexane and entrainer. In case this product contains a recoverable amount of entrainer the bottoms are passed through lines 41 and distilled in column 43 as described above for recovery of the entrainer and for production of a bottoms product which, in this case, is 2,4-dimethylpentane. This product is withdrawn from column 43 through line 45 for such utilization as desired.

SPECIFIC EXAMPLE

The following distillations were carried out in a column consisting of a glass tube approximately 2 feet in length and ¼ inch in inside diameter and containing a single wire spiral for packing. The column was insulated by a vacuum jacket and equipped with a suitable kettle and a total condensing head with a liquid take-off.

In Table I are given the data for several separations effected in this column:

Table I.—Separations obtained with trifluoroacetic acid as entrainer

| System | B. P., °F. | Charge, Vol. percent | Overhead Product | | |
|---|---|---|---|---|---|
| | | | Vol. percent | Temp., °F. | Liquid Phases |
| 2, 4-dimethylpentane | 176.6 | 33.3 | 11.1 | 137.3 | Two. |
| Cyclohexane | 177.3 | 33.3 | 28.9 | | |
| Trifluoroacetic Acid | 160 (734 mm.) | 33.4 | 60.0 | | |
| 2, 4-dimethylpentane | 176.9 | 33.3 | 38.0 | 142 | One. |
| Benzene | 176.2 | 33.3 | 4.0 | | |
| Trifluoroacetic Acid | 160 (734 mm.) | 33.4 | 58.0 | | |
| Cyclohexane | 177.3 | 33.3 | 41.4 | 138.3 | Two. |
| Benzene | 176.2 | 33.3 | 1.6 | | |
| Trifluoroacetic Acid | 160 (734 mm.) | 33.4 | 57.0 | | |
| Methylcyclohexane | 213.7 | 33.3 | 81.3 | 197 | Two. |
| Toluene | 231.1 | 33.3 | 8.0 | | |
| Heptafluorobutyric Acid | 248 (735 mm.) | 33.4 | 10.7 | | |
| Dimethylhexane Conc.[1] | 230-231 | 33.3 | 20.3 | 165 | One. |
| Toluene | 231.1 | 33.3 | 0.1 | | |
| Trifluoroacetic Acid | 160 (734 mm.) | 33.4 | 79.6 | | |

[1] Cut of HF alkylate.

From these data it is seen that the entrainers of this invention have decreasing affinity for hydrocarbons in the order of cycloparaffins, paraffins and aromatics.

The production according to the data of the above table of one liquid phase from the systems benzene-2,4-dimethylpentane - trifluoroacetic acid and toluene - dimethylhexane conc.-trifluoroacetic acid is merely incidental. Had the condenser been operated at a somewhat lower temperature, two liquid phases would have been produced.

Preferred large scale operation would take advantage of at least one of the above mentioned variables to produce two liquid phases from the overhead azeotropic vapors since less equipment is required to effect separation of the hydrocarbons than if conditions yield a single condensate phase.

However, if preferred for any reason whatever to operate the system under such conditions as to yield a single overhead condensate phase, the apparatus embodiment disclosed in Figure 2 of the drawing may be used. The apparatus is similar to that of Figure 1 and includes an extraction vessel 91 which has no counterpart in the system of Figure 1.

In the operation of the system of Figure 2, a charge stock containing equal volumes of 2,4-dimethylpentane, benzene and trifluoroacetic acid, from a source not shown, is passed through line 61 into the main azeotrope column 62. Sufficient reboiling heat is furnished through coil 72 and reflux through coil 71 to distill overhead an azeotrope of 2,4-dimethylpentane and trifluoroacetic acid. As mentioned above, some benzene is usually carried along within the overhead vapors. The overhead vapors from column 62 are removed therefrom through line 63, are condensed in condenser 65 and the condensate is passed on through line 66 into the accumulator vessel 67. In case pressure relief from tank 67 is necessary, we have provided a pipe 68 containing a relief valve 69. From accumulator 67 the single phase liquid is removed through line 70 and is introduced to the bottom portion of a liquid-liquid extraction vessel 76. Since the entrainer is miscible with water and, of course, the hydrocarbon is not, water makes an excellent extraction liquid. Water as a solvent is introduced into this column through line 99 and flows downward in countercurrent relation to the up-flowing hydrocarbon-entrainer mixture. From this operation pure hydrocarbon is removed as raffinate phase from the top of the extractor 76 through line 77 for such disposal as desired. The extract phase is removed from the bottom of vessel 76 through line 78 and this phase consists of a water solution of trifluoroacetic acid. This aqueous solution is then introduced into about the midpoint of a secondary azeotrope column 79. Heat for distillation in this column is furnished from coil 85 while reflux cooling is furnished through coil 84. This column is so operated that the excess of water over that required to form an azeotrope of water and trifluoroacetic acid is removed overhead through line 80. This vaporous water is condensed in condenser 81 and the condensate is passed on through line 99 as extraction solvent into the extractor 76. Any makeup water needed for this extraction operation may be added through line 82. An azeotropic mixture containing about 80 percent trifluoroacetic acid and 20 percent water accumulates as bottoms in the auxiliary column 79 and this mixture is withdrawn therefrom through line 83 and is introduced into the top of an auxiliary extractor 91. Into the bottom of this auxiliary extractor through line 94 is introduced the stream of hydrocarbon charge stock to the system. In this example, this hydrocarbon charge stock consists of equal volumes of 2,4-dimethylpentane and benzene. In this auxiliary column this hydrocarbon feed stock removes by extraction the trifluoroacetic acid and this mixture is removed from column 91 through line 92. From this line this material is passed through the aforementioned charge line 61 and the mixture introduced into the main azeotrope column 62. This mixture removed from the top of column 91 is the extract phase of this extraction operation while the material removed through the bottom line 93 consisting of water with possibly some trifluoroacetic acid in solution is the raffinate phase and this material from line 93 may be passed through line 96 containing valve 97 and added to the material flowing through line 78. The mixture is introduced into the secondary azeotrope column 79. This water-trifluoroacetic acid mixture from the bottom of extractor 91 is recycled into the azeotrope column 79 for the express purpose of recovering the trifluoroacetic acid not extracted in column 91. Accordingly, it is not necessary that the extraction of the entrainer by the hydrocarbon feed from line 94 be complete. If, however, the extraction in column 91 is complete and all of the entrainer is removed from the water, the raffinate phase then consisting of water only may be withdrawn through line 93 and passed through line 95 for recycling to the main extraction column 76 through lines 82 and 99 or this water from line 95 may be passed to any disposal as desired.

When the amount of entrainer azeotropically equivalent to the 2,4-dimethylpentane content of the feed stock to column 62 is used or when a slight deficiency of entrainer is used the liquid accumulating as bottoms in the main azeo column 62 will be benzene free from entrainer or substantially free from entrainer. However, in case an excess of entrainer is used some entrainer will accumulate in the benzene bottoms and this entrainer may be recovered in an auxiliary column similar to column 43 of Figure 1. A column similar to column 43 of Figure 1 is not shown in conjunction with the main azeo column 62 of Figure 2 for the purpose of simplicity. Bottoms from the column 62 is removed therefrom through line 64. Makeup entrainer is added to the system from a source, not shown, through line 98.

Still higher molecular weight completely fluorinated aliphatic acids which are liquid at operation temperatures may be used in the process of our invention.

Since these fluorinated acids are relatively strong acids, the equipment illustrated in Figures 1 and 2 should be selected so that corrosion will not occur.

Such auxiliary equipment as valves, pressure gages, regulators, flow controllers, pressure and temperature indicating and control equipment have not been shown for purposes of simplicity. The installation and use of such equipment is understood by those skilled in the art.

The above described flow diagrams and process descriptions are given for illustrative purposes and should not be considered as limiting our invention, the scope of which is set forth in the following claims.

We claim:

1. A method for separating 2,4-dimethylpentane and benzene from a feed mixture comprising said hydrocarbons comprising subjecting said mixture to distillation conditions in the presence of trifluoroacetic acid and thereby producing an overhead vaporous product and a liquid bottoms product, withdrawing the liquid bottoms product comprising benzene as one product of the process, condensing the overhead vaporous product, subjecting this condensate to liquid-liquid extraction with water, from this extraction operation withdrawing a raffinate phase comprising 2,4-dimethylpentane as the second product of the process, withdrawing therefrom an extract phase comprising water and trifluoroacetic acid and subjecting this withdrawn extract phase to distillation conditions to produce an overhead distillate comprising water and a bottoms comprising an azeotropic mixture of water and trifluoroacetic acid, subjecting said azeotropic mixture of water and trifluoroacetic acid to liquid-liquid extraction conditions in the presence of a mixture of hydrocarbons comprising 2,4-dimethylpentane and benzene, from this latter extraction operation withdrawing a raffinate phase comprising water and trifluoroacetic acid and adding this latter raffinate phase to the extract phase comprising water and trifluoroacetic from the first extraction operation, and withdrawing an extract phase comprising 2,4-dimethylpentane, benzene and trifluoroacetic from the latter extraction operation and introducing this latter withdrawn extract phase into the first mentioned distillation operation as at least a portion of the feed mixture.

2. A method for separating 2,4-dimethylpentane and benzene from a feed mixture comprising said hydrocarbons comprising subjecting said mixture to distillation conditions in the presence of trifluoroacetic acid and thereby producing an overhead vaporous product and a liquid bottoms product, withdrawing the liquid bottoms product comprising benzene as one product of the process, condensing the overhead vaporous product, subjecting this condensate to liquid-liquid extraction with water, from this extraction operation withdrawing a raffinate phase comprising 2,4-dimethylpentane as the second product of the process, withdrawing therefrom an extract phase comprising water and trifluoroacetic acid and subjecting this withdrawn extract phase to distillation conditions to produce an overhead distillate comprising water and a bottoms comprising an azeotropic mixture of water and trifluoroacetic acid, subjecting said azeotropic mixture of water and trifluoroacetic acid to liquid-liquid extraction conditions in the presence of a mixture of hydrocarbons comprising 2,4-dimethylpentane and benzene, from this latter extraction operation withdrawing a raffinate phase comprising water and an extract phase comprising 2,4-dimethylpentane, benzene and trifluoroacetic and introducing this latter withdrawn extract phase into the first mentioned distillation operation as at least a portion of the feed mixture comprising 2,4-dimethylpentane and benzene.

3. A method for separating cyclohexane and 2,4-dimethylpentane from a hydrocarbon mixture comprising these hydrocarbons comprising subjecting said mixture to distillation conditions in the presence of trifluoroacetic acid and producing an overhead distillate and a bottoms, withdrawing the bottoms comprising 2,4-dimethylpentane as one product of the process, condensing said overhead distillate and separating therefrom a hydrocarbon phase comprising cyclohexane and trifluoroacetic acid and an acid phase comprising trifluoroacetic acid and 2,4-dimethylpentane in solution, returning this acid phase to said distillation operation, subjecting the separated hydrocarbon phase to distillation conditions and recovering therefrom a bottoms product comprising cyclohexane as the second product of the process and an overhead distillate and combining this latter distillate with the first mentioned distillate.

4. A method for separating cyclohexane and benzene from a hydrocarbon mixture comprising these hydrocarbons comprising subjecting said mixture to distillation conditions in the presence of trifluoroacetic acid and producing an overhead distillate and a bottoms, withdrawing the bottoms comprising benzene as one product of the process, condensing said overhead distillate and separating therefrom a hydrocarbon phase comprising cyclohexane and trifluoroacetic acid in solution and an acid phase comprising trifluoroacetic and benzene in solution, returning this acid phase to said distillation operation, subjecting the separated hydrocarbon phase to distillation conditions and recovering therefrom a bottoms product comprising cyclohexane as the second product of the process and an overhead distillate and combining this latter distillate with the first mentioned distillate.

5. A method for separating cyclohexane and 2,4-dimethylpentane from a hydrocarbon mixture comprising these hydrocarbons comprising subjecting said mixture to distillation conditions in the presence of heptafluorobutyric acid and producing an overhead distillate and a bottoms, withdrawing the bottoms comprising 2,4-dimethylpentane as one product of the process, condensing said overhead distillate and separating therefrom a hydrocarbon phase comprising cyclohexane and heptafluorobutyric acid in solution and an acid phase comprising heptafluorobutyric and 2,4-dimethylpentane in solution, returning this acid phase to said distillation operation, subjecting the separated hydrocarbon phase to distillation conditions and recovering therefrom a bottoms product comprising cyclohexane as the second product of the process and an overhead distillate and combining this latter distillate with the first mentioned distillate.

6. A method for separating cyclohexane and benzene from a hydrocarbon mixture comprising these hydrocarbons comprising subjecting said mixture to distillation conditions in the presence of heptafluorobutyric acid and producing an overhead distillate and a bottoms, withdrawing the bottoms comprising benzene as one product of the process, condensing said overhead distillate and separating therefrom a hydrocarbon phase comprising cyclohexane and heptafluorobutyric acid in solution and an acid phase comprising heptafluorobutyric and benzene in solution, returning this acid phase to said distillation operation, subjecting the separated hydrocarbon phase to distillation conditions and recovering therefrom a bottoms product comprising cyclohexane as the second product of the process and an overhead distillate and combining this latter distillate with the first mentioned distillate.

7. In the refining of hydrocarbons the improvement comprising subjecting a mixture of 2,4-dimethylpentane and cyclohexane to distillation conditions in the presence of trifluoroacetic acid, recoveing cyclohexane from the overhead distillate and 2,4-dimethylpentane from the distillation bottoms.

8. In the refining of hydrocarbons the improvement comprising subjecting a mixture of 2,4-dimethylpentane and benzene to distillation conditions in the presence of trifluoroacetic acids, recovering 2,4-dimethylpentane from the distillate and benzene from the distillation bottoms.

9. In the refining of hydrocarbons the improvement comprising subjecting a mixture of cyclohexane and benzene to distillation conditions in the presence of trifluoroacetic acid, recovering cyclohexane from the distillate and benzene from the distillation bottoms.

10. In the refining of hydrocarbons the improvement comprising subjecting a mixture of two close boiling hydrocarbons, said two close boiling hydrocarbons being selected from at least two of the following groups of hydrocarbons consisting of acyclic paraffinic hydrocarbons, cycloparaffinic hydrocarbons and aromatic hydrocarbons to distillation conditions in the presence of trifluoroacetic acid and boiling within 80° F. of the boiling point of the hydrocarbon taken overhead, recovering one hydrocarbon from the distillate and the other hydrocarbon from the distillation bottoms.

11. In the refining of hydrocarbons the improvement comprising subjecting a mixture of two close boiling hydrocarbons, said two close boiling hydrocarbons being selected from at least two of the following groups of hydrocarbons consisting of acyclic paraffinic hydrocarbons, cycloparaffinic hydrocarbons and aromatic hydrocarbons to distillation conditions in the presence of heptafluorobutyric acid and boiling within 80° F. of the boiling point of the hydrocarbon taken overhead, recovering one hydrocarbon from the distillate and the other hydrocarbon from the distillation bottoms.

12. In the refining of hydrocarbons the improvement comprising subjecting a mixture of methylcyclohexane and toluene to distillation conditions in the presence of heptafluorobutyric acid, recovering methylcyclohexane from the overhead distillate and toluene from the distillation bottoms.

13. In the refining of hydrocarbons the improvement comprising subjecting a mixture of dimethylhexane concentrate and toluene to distillation conditions in the presence of trifluoroacetic acid, recovering dimethylhexane from the overhead distillate and toluene from the distillation bottoms.

14. In the refining of hydrocarbons the improvement comprising distilling a mixture of two hydrocarbons difficultly separable by distillation and selected from separate hydrocarbon types of a group of hydrocarbon types consisting of acyclic paraffinic hydrocarbons, cycloparaffinic hydrocarbons and aromatic hydrocarbons, in the presence of an entrainer boiling within 80° F. of the boiling point of the hydrocarbon taken overhead and selected from the group consisting of trifluoroacetic acid and heptafluorobutyric acid, recovering one hydrocarbon from the distillate and the other hydrocarbon from the still bottoms.

References Cited in the file of this patent

UNITED STATES PATENTS

| | | |
|---|---|---|
| 1,892,770 | Jaeger | Jan. 3, 1933 |
| 2,085,546 | Roelfsema | June 29, 1937 |
| 2,279,194 | Field | Apr. 7, 1942 |
| 2,290,636 | Deanesly | July 21, 1942 |
| 2,348,726 | Clark | May 16, 1944 |
| 2,356,240 | Hamlin | Aug. 22, 1944 |
| 2,358,129 | Lake | Sept. 12, 1944 |
| 2,415,192 | Rittenhouse | Feb. 4, 1947 |
| 2,432,771 | Lake | Dec. 16, 1947 |
| 2,614,965 | Ruehlen | Oct. 21, 1952 |

OTHER REFERENCES

Mair et al.: Journal of Research of the National Bureau of Standards, vol. 27, No. 1, July 1941, pages 44 and 46.

UNITED STATES PATENT OFFICE

CERTIFICATE OF CORRECTION

Patent No. 2,794,773

June 4, 1957

Martin R. Cines et al.

It is hereby certified that error appears in the printed specification of the above numbered patent requiring correction and that the said Letters Patent should read as corrected below.

Column 2, line 66, for "and" read -- into --; column 4, line 64, after "trifluoroacetic" insert -- acid --; column 5, line 13, for "238° F." read -- 138° F. --; line 33, for "if used" read -- is used --; column 8, line 43, after "acid" insert -- in solution --; same column, line 61, and column 9, line 19, for "benzene" in each occurrence, read -- cyclohexane --; same column 9, line 30, for "recoveing" read -- recovering --.

Signed and sealed this 15th day of October 1957.

(SEAL)
Attest:
KARL H. AXLINE
Attesting Officer

ROBERT C. WATSON
Commissioner of Patents